Sept. 11, 1956  J. R. JOHNSON  2,762,989
CAPACITOR MOUNT
Filed Oct. 16, 1952

INVENTOR.
JOHN RAUCHE JOHNSON
BY
Ostrolenk & Faber
ATTORNEYS

United States Patent Office 2,762,989
Patented Sept. 11, 1956

2,762,989
CAPACITOR MOUNT

John Rauche Johnson, Arcadia, Calif., assignor to Solar Manufacturing Corporation, Los Angeles, Calif., a corporation of New York Application October 16, 1952, Serial No. 315,069

1 Claim. (Cl. 339—128)

The present invention relates to capacitors and more particularly it relates to capacitors that can be easily snapped in place and can be easily soldered in their electrical circuit.

As is well-known in the art, capacitors are soldered to their electrical circuit and more particularly by-pass and grounding capacitors are soldered on one side to ground, which is usually the chassis, and on the other side to the electrical circuit.

Furthermore, in printed circuit techniques, the printed circuit which comprises a number of conductors printed on a plastic base provides a circular conductor as one contact for the disc capacitors used in printed circuits.

There are quite a few ways for connecting and securing these capacitors to the corresponding portion of the printed circuit, for example, by means of springs or clips as disclosed in patent application Serial No. 213,125.

All these means for securing and connecting capacitors to their electrical circuits require, as is quite evident, a considerable amount of labor.

The novel capacitor consists essentially of a cylindrical conductor mounted inside a dielectric cylinder. The dielectric cylinder is provided with two plates, an inside plate making electrical contact with the cylindrical conductor and the outside plate surrounding the outside surface of the dielectric cylinder.

Resilient mounting means are mounted and secured to the outside surface of the dielectric cylinder and have an extension which, when soldered, makes good electrical contact with the outside plate of the capacitor.

When they are to be used in printed circuits, the printed circuit can be provided with appropriate cylindrical openings where the novel capacitors can be easily snapped in; and if the opening is surrounded by a printed conductor, there will be good electrical contact between the printed circuit conductor and the outside plate of the capacitor. The capacitor's metallic conductor is also provided with a hook-shaped end so that an electrical circuit can be easily connected and soldered to it.

If the novel capacitors are to be used as by-pass capacitors in electrical circuits mounted on a metallic chassis, circular openings can be made on the chassis and the novel capacitors snapped in place. This way one plate of the novel capacitors is grounded, while the other plate, that is the cylindrical conductor, can be connected to that portion of the electrical circuit that must be by-passed.

Accordingly, one object of the present invention is a capacitor that can be easily mounted in place and soldered, if necessary.

More particularly, an object of the present invention is a capacitor that can be snapped in place and soldered later, if necessary.

The resilient mounting means are V-shaped and are mounted under a flat circular surface constituting one contact of the capacitor. These mounting means serve not only to obtain a snap-in action when the capacitors are inserted in appropriate openings but also to produce a bias so directed as to result in good electrical contact between the flat contact of the capacitor and the printed conductor, if printed conductors are used, or the conventional chassis if such chassis is used.

Accordingly, an object of the present invention is the provision of means whereby a capacitor contact is biased against a conducting surface producing a high pressure contact engagement between the capacitor contact and the conducting surface.

Another object of the present invention is a capacitor of rugged construction which can be easily connected to electrical circuits.

Furthermore, the novel capacitor is entirely soldered-plated, thus providing a surface that maintains soldering characteristics regardless of age.

Accordingly, another object of the present invention is an entirely soldered-plated capacitor to provide a surface that maintains soldering characteristics regardless of age.

It is easily seen that by the use of the novel capacitor not only is considerable space saved but the number of conductors is also decreased. This is a considerable advantage over the previous capacitors in that at very high frequencies the number and length of conductors should be small to decrease as much as possible stray capacitances and, therefore, stray coupling and distortion.

Accordingly, another object of the present invention is the provision of novel means whereby the number of conductors in an electrical circuit can be considerably decreased and considerable space can be saved.

A further object of the present invention is a capacitor that can be quickly and easily constructed with a minimum of labor.

These and other objects and advantages of the present invention will become apparent in the following description and drawings in which.

Figure 1:
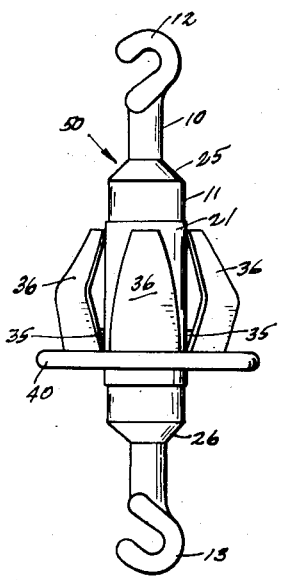
Figure 1 is a front view of one embodiment of the present invention.
Figure 2:
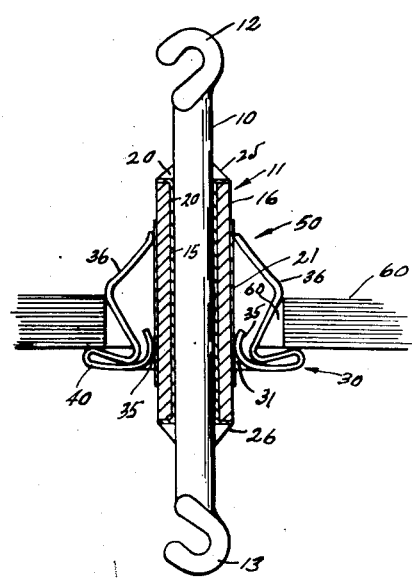
Figure 2 is a cross-section taken at line 1—1 of the embodiment of Figure 1 shown mounted in place.

Referring now to Figures 1 and 2 showing an embodiment of the invention, a solid metallic cylinder 10 surrounded by a cylindrically shaped dielectric 11 has two hook-like extensions 12 and 13. Dielectric 11 is provided with metallic plating, that is, the internal surface 15 and the external surface 16 of dielectric 11 are plated, the plating 20 of internal surface 15 being separated from the plating 21 of external surface 16.

The internal plating 20 overlaps the internal surface 15 extending on both extremities 25 and 26 of dielectric cylinder 11. Cylinder 10 is soldered or secured by any other suitable conductive means to these plated extremities 25 and 26 of dielectric cylinder 11.

A tack-shaped metallic mounting 30 having a central opening 31 and two sets of finger-like extensions 35 and 36 is placed around the cylindrical dielectric 11 so that the head 40 of tack-like member 30 surrounds the external plating 21 of dielectric 11. This tack-like member 30 is secured to the dielectric 11 by solder or any other suitable means.

One set of extensions 35 serve to secure tack-like member 30 to dielectric cylinder 11, while the other set of extensions 36 which are resilient and appropriately shaped serve to secure the complete capacitor 50 to its correct place as shown in Figure 2.

In Figure 2, in fact, a chassis or plastic base 60 is shown with an opening 61 through which capacitor 50 can be easily snapped in place. As the capacitor 50 is pushed into opening 61, the finger-like resilient extensions 36 are forced to flatten to permit the passage of part of the capacitor 50, that is, to permit passage through opening 61 of that part of capacitor 50 that is below the head 40 of tack-like mounting 30.

As the capacitor 50 snaps in place, extensions 36, being resilient, resume their original shape, thus securing capacitor 50 to the chassis or base 60. And if the region of chassis or base 60 directly under the head 40 of tack-shaped member 30 has been previously provided with a conducting layer (not shown) as in printed circuits or if the chassis 60 is metallic and provides the common ground for the electrical circuit, the direction of the bias produced by the resilient finger-like extension 36 is such that good electrical contact is made between the tack-shaped member 30 acting as one plate of capacitor 50 and the conducting portion of chassis or base 60. In Figure 2, for example, the capacitor 50 is biased in the downward direction.

The assembly of capacitor 50 is extremely simple due to the fact that every part constituting capacitor 50 can be separately produced. The assembly, for example, could be made in the following steps.

First, the cylindrical rod 10 having a hook-shaped extension 12 at one end is inserted into the hollow dielectric cylinder 11 which was previously plated on its internal surface 15 and on its external surface 16. The cylindrical rod 10 being longer than hollow cylinder 11 will have a protruding extension 13 which can now be spatulated and made hook-like as shown in Figures 1 and 2.

The cylindrical rod 10 is then firmly secured to cylinder 11 by any suitable means, for example, by soldering cylindrical rod 10 to extensions 25 and 26 of the internal plating 20 of hollow cylinder 11.

This soldering operation provides also a means to make good electrical contact between metallic rod 10 and internal plate 20 of capacitor 50.

Finally the mounting 30 is placed around dielectric cylinder 11 and soldered thereon to provide good electrical contact between mounting 30 and the external plate 21 of capacitor 50.

The mounting 30, as previously described, has two sets of extensions 35 and 36. Extensions 35 serve to secure firmly mounting 30 to capacitor dielectric cylinder 11, while extensions 36 are shaped so that the mounting 30 and, therefore, capacitor 50 can be inserted and secured in appropriate openings in the chassis or base of electrical equipment.

As for the actual mounting operation of capacitor 50, it is now evident that capacitor 50 is first snapped in place in appropriate openings as, for example, openings 61 in Figure 2 and then soldered, if necessary. Electrical circuits can now be connected to either hook 12 or 13 or to both by appropriate soldering operations.

Figure 3:
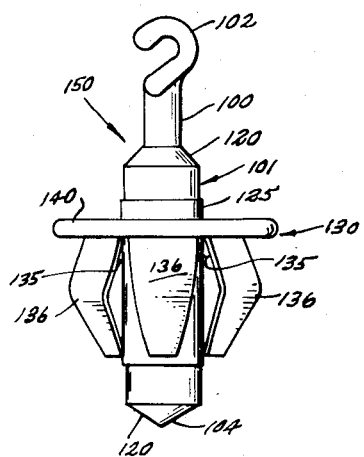
Figure 3 is a front view of another embodiment of the present invention.

Referring now to Figure 3 showing another embodiment of the present invention, a metallic rod 100 of appropriate length is surrounded by a dielectric hollow cylinder 101. Metallic rod 100 is provided at one end with a hook 102 and its length is such that it does not protrude from the other end 104 of cylinder 101.

As in the previous embodiment, dielectric cylinder 101 has two platings, an internal plating 120 which extends and covers the two ends of cylinder 101 and an external plating 121 which surrounds a major portion of the outside surface 125 of cylinder 101.

Metallic rod 100 is suitably soldered to dielectric 101, thus providing a good electrical contact between rod 100 and capacitor plate 120.

A mounting 130 having two sets of extensions 135 and 136 surrounds the external plating 121 of dielectric 101 and is secured thereon by means of the interior sets of extensions 135 which grip firmly dielectric cylinder 101. Here too in order to provide good electrical contact between mounting 130 and external plate 121 of dielectric cylinder 101, the head 140 of mounting 130 is connected by suitable process, for example, soldering to a portion of external plate 121.

In this embodiment, mounting 130 is placed so that its head 140 is nearer to the hook-shaped extension 102 of rod 100. Because of the particular way in which mounting 130 is placed on dielectric cylinder 101, when this capacitor 150 is snapped in place in a chassis or base (not shown), the hook extension 102 and the mounting head 140 will lie on one side of the chassis or base, while the rest of the capacitor 150 will lie on the other side of the chassis or base.

Figure 4:
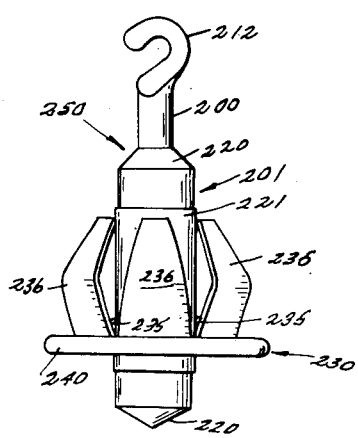
Figure 4 is a front view of another embodiment of the present invention.

Referring now to Figure 4 which shows still another embodiment of this invention, all the elements such as the metallic rod 200, dielectric 201, hook 212 and platings 220 and 221 are similar and similarly mounted with respect to each other to the embodiment described in connection with Figure 3, except the mounting 230 which is here mounted with its head 240 nearer to the hookless end of capacitor 250. Because of this change in the relative position of mounting 230, when capacitor 250 is snapped in place in an appropriate opening of a chassis or base (not shown), the hook 212 will be on one side of the chassis or base, while the head 240 of mounting 230 lies on the other side of the chassis or base.

It must be added that the entire unit, as shown in its various embodiments in Figures 1, 2, 3 and 4, is soldered-plated to provide a surface that maintains soldering characteristics regardless of age, thus considerably increasing its commercial value.

It is also evident that the novel mounting is applicable not only to capacitors as here disclosed but can be used just as well for appropriately shaped resistors and inductors.

In the foregoing the invention has been described solely in connection with specific illustrative embodiments thereof. Since many variations and modifications of the invention will now be obvious to those skilled in the art, it is preferred to be limited not by the specific disclosures herein contained but only by the appended claim.

I claim:

A mounting device for mounting an electrical component in an opening of a fixed support comprising an annular head having an inner and outer periphery; two pluralities of finger-like extensions extending from said annular head, one of said pluralities of finger-like extensions extending from the inner periphery of the head in a longitudinal direction and providing electrical connection between said mounting and said electrical component, the second of said pluralities of finger-like extensions extending from the outer periphery of the annular head, being bowed and resilient, contacting the component at the free ends of the finger-like extensions to stabilize the component, and having the apex of the said bowed extensions engaging one surface of the support and being longitudinally displaced from the annular head which engages the opposite side of the support, thereby permitting said mounting to abut the upper and lower surfaces of the support and prevent longitudinal movement of the component through the opening.

References Cited in the file of this patent

UNITED STATES PATENTS

| | | |
|---|---|---|
| 2,140,441 | Clark | Dec. 13, 1938 |
| 2,141,878 | Roby | Dec. 27, 1938 |
| 2,463,826 | Thacker | Mar. 8, 1949 |
| 2,603,675 | Binek | July 15, 1952 |
| 2,641,647 | Wallin | June 9, 1953 |

OTHER REFERENCES

Centralab advertisement "Capacitors Bushing Mounted Type" in "Electrical Equipment," December 1943, vol. 3, #12, page 12.